United States Patent
Barth et al.

(10) Patent No.: US 11,436,208 B2
(45) Date of Patent: Sep. 6, 2022

(54) COMPUTERIZED SOFTWARE ENGINE TO ASSESS PHYSICAL VALUE USING DOCUMENT VERSIONING

(71) Applicant: SAP SE, Walldorf (DE)

(72) Inventors: Volker Barth, Bad Schoenborn (DE); Ralf Mueller, Angelbachtal (DE); Andy Peichl, Ubstadt-Weiher (DE); Michael Goll, Heidelberg (DE); Harald Schlueter, Walldorf (DE); Manfred Crumbach, Wiesloch (DE); Anuj Dham, Sunnyvale, CA (US)

(73) Assignee: SAP SE, Walldorf (DE)

( * ) Notice: Subject to any disclaimer, the term of this patent is extended or adjusted under 35 U.S.C. 154(b) by 241 days.

(21) Appl. No.: 14/974,144

(22) Filed: Dec. 18, 2015

(65) Prior Publication Data

US 2017/0177630 A1 Jun. 22, 2017

(51) Int. Cl.
*G06F 16/30* (2019.01)
*G06F 16/21* (2019.01)
*G06F 16/27* (2019.01)

(52) U.S. Cl.
CPC .......... *G06F 16/219* (2019.01); *G06F 16/275* (2019.01)

(58) Field of Classification Search
CPC ... G06F 16/288; G06F 16/275; G06F 16/9024
USPC ........ 707/609, 687, 705, 769, 790, 813, 821
See application file for complete search history.

(56) References Cited

U.S. PATENT DOCUMENTS

| | | | |
|---|---|---|---|
| 6,591,377 B1 | 7/2003 | Evoy | |
| 7,406,436 B1* | 7/2008 | Reisman | G06Q 30/0282 705/7.33 |
| 7,467,105 B2 | 12/2008 | Rocckelein et al. | |
| 7,716,171 B2 | 5/2010 | Kryger | |
| 8,521,700 B2 | 8/2013 | Chambliss et al. | |
| 8,650,150 B2 | 2/2014 | Zhao et al. | |
| 2001/0041996 A1* | 11/2001 | Eder | G06Q 10/06 705/7.29 |
| 2004/0088334 A1 | 5/2004 | Klein | |
| 2006/0206507 A1* | 9/2006 | Dahbour | G06F 16/9024 |
| 2008/0162589 A1* | 7/2008 | Rodeheffer | G06F 11/1469 |
| 2009/0012991 A1 | 1/2009 | Johnson et al. | |
| 2009/0037242 A1 | 2/2009 | Ventura et al. | |
| 2010/0017647 A1* | 1/2010 | Callaway | G06Q 40/04 714/48 |
| 2011/0035581 A1* | 2/2011 | Maller | G06Q 30/06 709/206 |
| 2011/0276423 A1* | 11/2011 | Davidson | H04N 21/44016 705/26.1 |
| 2014/0279384 A1 | 9/2014 | Loevenich | |
| 2018/0173755 A1* | 6/2018 | Xia | G06F 16/9024 |
| 2018/0173763 A1* | 6/2018 | Xia | G06F 16/9024 |
| 2019/0384927 A1* | 12/2019 | Bhatnagar | G06F 16/2365 |

\* cited by examiner

*Primary Examiner* — Sana A Al-Hashemi
(74) *Attorney, Agent, or Firm* — Fountainhead Law Group P.C.

(57) ABSTRACT

A computer system may create version records in a versioned database that stores data from transaction documents. Each version record may include a timestamp that represents a time from which the data stored in the version record is valid. The timestamp may represent the time of creation of particular version of the transaction document. The version records may be accessed to perform a valuation for a specified time.

20 Claims, 6 Drawing Sheets

| DOC ID (504a) | valid from (504b) | QTY (504c) | data field 2 (504d) | • • • | data field n |
|---|---|---|---|---|---|
| • • • | | | | | |
| 4711 | 2015-08-01 09:10:10 | 10 MT | data field 2 | • • • | data field n |
| • • • | | | | | |

| DOC ID (504a) | valid from (504b) | QTY (504c) | data field 2 (504d) | • • • | data field n |
|---|---|---|---|---|---|
| • • • | | | | | |
| 4711 | 2015-08-01 09:10:10 | 10 MT | data field 2 | • • • | data field n |
| 4712 | 2015-08-02 13:10:25 | 25 MT | data field 2 | • • • | data field n |
| • • • | | | | | |

| DOC ID (504a) | valid from (504b) | QTY (504c) | data field 2 (504d) | • • • | data field n |
|---|---|---|---|---|---|
| • • • | | | | | |
| 4711 | 2015-08-01 09:10:10 | 10 MT | data field 2 | • • • | data field n |
| 4712 | 2015-08-02 13:10:25 | 25 MT | data field 2 | • • • | data field n |
| 4712 | 2015-08-02 13:30:47 | 28 MT | data field 2 | • • • | data field n |
| • • • | | | | | |

COMPUTERIZED SOFTWARE ENGINE TO ASSESS PHYSICAL VALUE USING DOCUMENT VERSIONING

BACKGROUND

International enterprises typically perform business on a 24 hour basis, and often seven days a week. Consequently the information systems in such an enterprise need to stay accessible for capturing deals and executing on these deals. This means there is no point in the day where the information systems can be shut down in order to perform and end-of-day evaluation of the enterprise. However, there is a strong need for to be able to compute end-of-day valuations in order to support business decisions catering for volatile market data. End-of-day valuations need to be available in a very timely manner in order to allow for timely responses on changed market data, such as hedging decisions to protect the enterprise's profitability.

End-of-day valuations should be precise and predictable. An end-of-day valuation (e.g., at 5 pm) should reflect all trades (purchases, sales, inventory, etc.) that have concluded by 5 pm. Any changes that occur after 5 pm should not be incorporated in the valuation calculation.

Conventional snapshot processing makes a copy of the transactions used to compute end-of-day valuations, such as purchase orders, sales orders, inventory lists, and other documents that can be used to assess the enterprise's valuation. Making copies can incur a time delay that can result in the snapshotted transactions being out of sync.

Consider a simple example, where an end-of-day valuation is processed for 5 pm. The process (e.g., a batch process) may begin, say, at 4:50 pm where a first transaction (T1) is copied (snapshot taken). Suppose transaction T1 is subsequently updated at 4:55 pm. Suppose an update occurs to a transaction T2 at 4:56 pm. Suppose the batch process reaches transaction T2 at 4:57 pm. Valuation will be made using transaction T1 from 4:50 pm and transaction T2 from 4:56 pm. The valuation will not reflect the latest change made to transaction T1 since it was copied at 4:50 pm but was updated at 4:55 pm.

Conventional solutions include "locking" access to all transactions at the time the batch process begins, in order to prevent updates to the transactions. This approach may not be suitable when the enterprise is operating globally and transactions are being processed 24 hours.

SUMMARY

In accordance with aspects of the present disclosure, a method in an enterprise may include first computers sending to a second computer first information representative of initial versions of documents. The second computer may create version records in a versioned database and store data in data fields of the version records using the first information, including storing timestamp data representative of respective times of creation of the initial versions of the documents. The first computers may send to the second computer additional information representative of subsequent versions of the documents. For each subsequent version of a given document, the second computer may create a corresponding version record, store data in data fields of the created version record using the additional information, and store timestamp data in the version record representative of the time of creation of the subsequent version of the given document. The second computer may receive a request that includes a specified time and in response thereto, may access version records corresponding to most recent versions of documents associated with timestamps, determine a value associated with each document using data from the data fields of the corresponding version record, and compute an aggregated value from the values determined.

In some aspects, the data fields may relate to computing mark to market values of the enterprise.

In some aspects, the documents may comprise purchase contracts and sales contracts in the enterprise, and the aggregated value is a mark to market value of the enterprise. The documents may further comprise inventory documents indicative of inventory in the enterprise.

In some aspects, the method may further comprise the second computer receiving additional information from external systems separate from the enterprise and using the additional information received to determine the value of each corresponding document.

In some aspects, the method may further comprise the second computer storing initial versions of the documents and subsequent versions of the documents in a document database.

In some aspects, the method may further comprise the second computer receiving a request that includes a predetermined timestamp, wherein the request is received once every business day with the same predetermined timestamp.

In some aspects, the request can be received at any time during the day.

In accordance with aspects of the present disclosure, a system in an enterprise may comprise a plurality of first computers and a second computer. The plurality of first computers may be configured to send to the second computer first information representative of initial versions of documents created among the plurality of first computers. The second computer may be configured to create version records in a versioned database for the initial versions of the documents and store data in data fields of the version records using the first information including storing timestamp data representative of respective times of creation of the initial versions of the documents. The plurality of first computers may be further configured to send to the second computer additional information representative of subsequent versions of the documents. For each subsequent version of a given document, the second computer may be configured to create a corresponding version record in the versioned database, store data in data fields of the created version record using the additional information, and store timestamp data in the version record representative of a time of creation of the subsequent version of the given document. The second computer may be configured to receive a request that includes a specified time and in response thereto may access version records corresponding to most recent versions of documents associated with timestamps equal in time to or earlier in time than the specified time, determine a value associated with each document using data from the data fields of its corresponding accessed version record, and compute an aggregated value from the values determined.

In some aspects, the data fields may relate to computing mark to market values of the enterprise.

In some aspects, the documents may comprise purchase contracts and sales contracts in an enterprise, and the aggregated value is a mark to market value of the enterprise.

In some aspects, the documents may further comprise inventory documents indicative of inventory in the enterprise.

In some aspects, the second computer may be further configured to receive additional information from external systems separate from the enterprise and use the additional information received to determine the value of each corresponding document.

In some aspects, the document database may be separate from the versioned database.

In some aspects, the second computer may be further configured to receive a request that includes a predetermined timestamp, wherein the request is received once every business day with the same predetermined timestamp.

In accordance with aspects of the present disclosure, a non-transitory computer readable storage medium may have stored thereon computer executable program instructions, which when executed by a computer system cause the computer system to perform steps including receiving from a plurality of first computers first information representative of initial versions of documents created among the plurality of first computers, creating version records in a versioned database for the initial versions of the documents and storing data in data fields of the version records using the first information including storing timestamp data representative of respective times of creation of the initial versions of the documents. The computer system may receive from the plurality of first computers additional information representative of subsequent versions of the documents. For each subsequent version of a given document, the computer system may create a corresponding version record in the versioned database, store data in data fields of the created version record using the additional information, and store timestamp data in the version record representative of a time of creation of the subsequent version of the given document. The computer system may receive a request that includes a specified time and in response thereto access version records corresponding to most recent versions of documents associated with timestamps equal in time to or earlier in time than the specified time, determine a value associated with each document using data from the data fields of its corresponding accessed version record, and compute an aggregated value from the values determined.

In some aspects, the data fields may relate to computing mark to market values of the enterprise.

In some aspects, the documents may comprise purchase contracts, sales contracts, and inventory documents indicative of inventory in an enterprise, and the aggregated value is a mark to market value of the enterprise.

In some aspects, the computer system may further receive additional information from external systems separate from the enterprise and using the additional information received to determine the value of each corresponding document.

In some aspects, the computer system may further receive a request that includes a predetermined timestamp, wherein the request is received once every business day with the same predetermined timestamp.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

Like reference numerals refer to corresponding parts throughout the several views of the drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
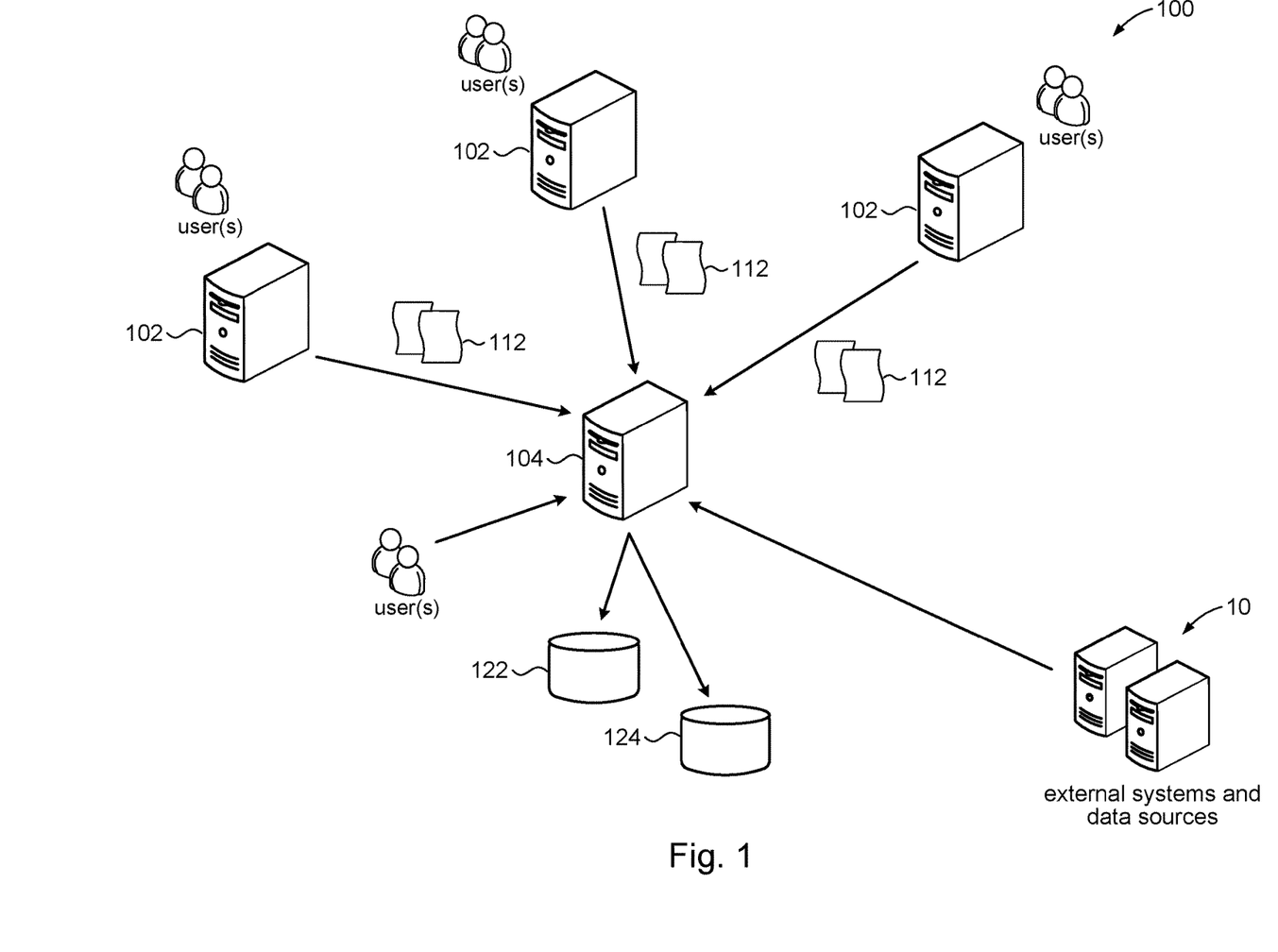
FIG. 1 is high level system diagram in accordance with the present disclosure.

FIG. 1 shows a system in accordance with embodiments of the present disclosure. An enterprise 100 may comprise computer systems 102 to support its operations; e.g., manufacturing, sales, customer support, etc. The computer systems 102 may be deployed throughout the enterprise 100. The enterprise 100 may be worldwide, and so the computer systems 102 may be distributed across the globe in various business centers that comprise the enterprise 100, and interconnected by suitable communication networks (not shown).

Users at computer systems 102 may generate various transaction documents 112 in the course of doing their jobs in the enterprise 100. For example, users may generate transaction documents 112 such as purchase orders (purchase contracts) to obtain raw materials, supplies, services, and so on to support the enterprise 100. The transaction documents 112 may include sales agreements (sales contracts) for the sale of goods and/or services produced by the enterprise 100. Users in the enterprise 100 may create transaction documents 112 for tracking inventory (inventory documents) in the enterprise 100 such as finished products and raw materials and components used to manufacture the finished products.

The enterprise 100 may include a computer system 104 to manage the transaction documents 112 (e.g., a document server) that users in the enterprise 100 may generate. The computer system 104 may access a document data store 122 to manage and store the transaction documents 112.

In accordance with the present disclosure, the computer system 104 may support version tracking to track changes in the information contained in a given transaction document 112 as changes are made to the given transaction document 112. For example, a user may draft a sales agreement to sell some quantity of goods to a potential buyer. Over the course of negotiating the sale, revisions of the sales agreement may be made. The computer system 104 may manage the sales agreement itself (the transaction document) in addition to information contained in the sales agreement. The computer system 104 may access a versioned data store 124 to manage and track changes to the information contained in different versions of the sales agreement. These aspects of the present disclosure will be discussed in more detail below.

In accordance with the present disclosure, the computer system 104 may have access to various external systems and data stores 10, which may serve as data sources. This aspect of the present disclosure will be discussed in more detail below.

Figure 2:
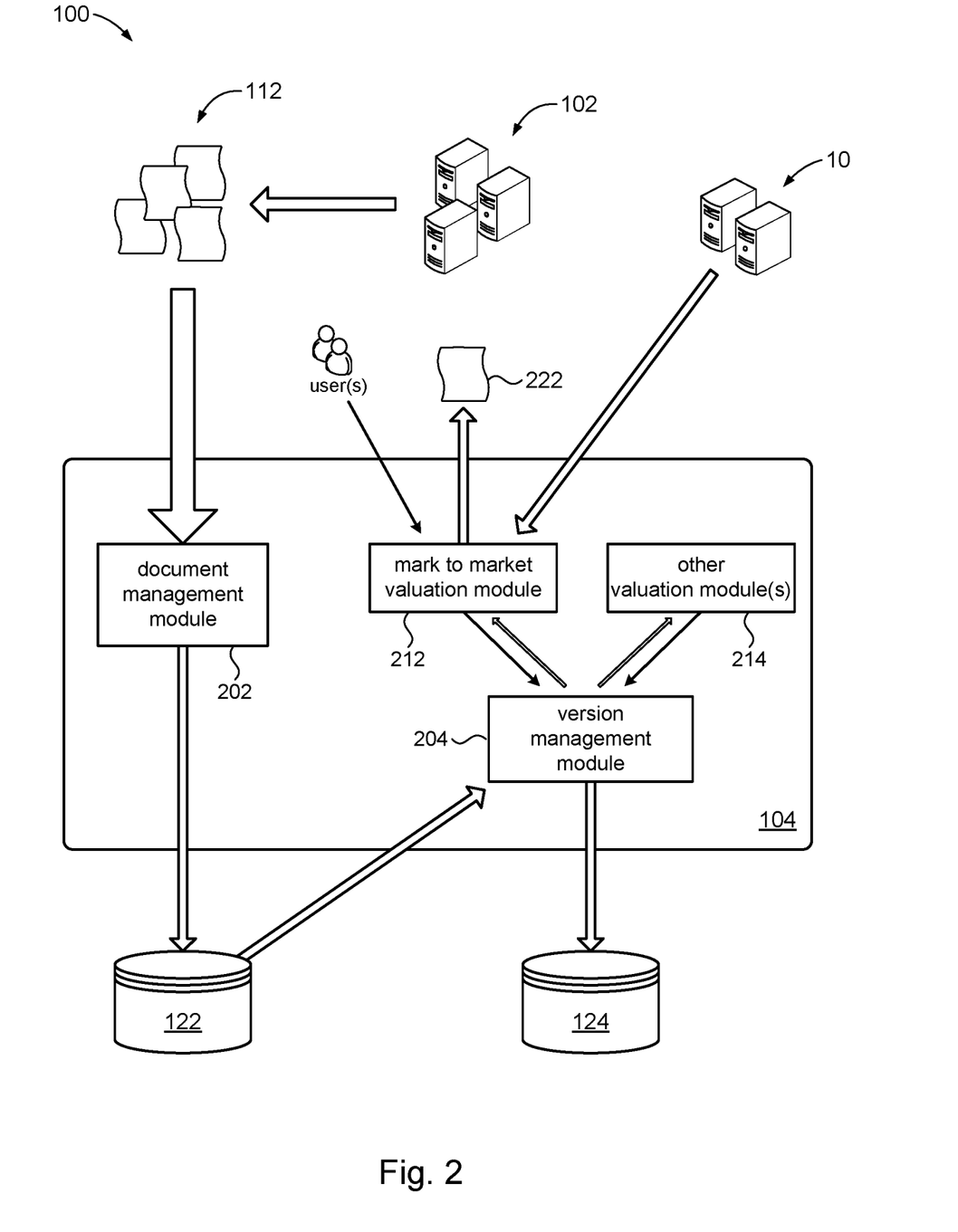
FIG. 2 shows details of a computer system configured to provide versioning and valuation processing in accordance with the present disclosure.

FIG. 2 shows some detail of computer system 104 in accordance with some embodiments of the present disclosure. The figures shows logical modules (components) that may comprise the computer system 104 in accordance with some embodiments. The particular configuration of the modules in a particular implementation of computer system 104 may be as depicted in the figure. In other implementations of computer system 104, the functionality represented by the modules may be arranged other than as shown in the figure.

The computer system 104 may include a document management module 202 and a version management module 204. In some embodiments, the document management module 202 may be a document database server configured to manage and store transaction documents 112 generated by users using computer systems 102.

As noted above, transaction documents 112 may be modified over time as details of the transactions change. For example, purchase orders and sales agreements may change over the course of negotiating the transaction. Inventory documents may change as inventory in the enterprise 100 fluctuates, and so on. In accordance with the present disclosure, the document management module 202 may be further configured to maintain and track successive versions of the transactions documents 112 as changes are made to the transaction documents 112. Further in accordance with the present disclosure a version management module 204 may be configured to maintain and track changes to certain information contained in different versions of the transaction documents 112.

In accordance with the present disclosure, the computer system 104 may include valuation modules 212, 214 configured to compute or otherwise determine valuations based on the values of the transaction documents 112. In some embodiments, for example, the computer system 104 may include a mark to market valuation module 212, and in other embodiments the computer system 104 may include additional valuation modules 214. In some embodiments, the mark to market valuation module 212 may be configured to compute or otherwise determine valuation metrics 222 of the enterprise 100, referred to as "mark to market," by aggregating the values of the transaction documents 112. In other embodiments, other valuation metrics may be computed using additional valuation modules 214.

In accordance with the present disclosure, the valuation modules 212, 214 may be configured to cause the version management module 204 to obtain information (referred to as valuation data or pricing-related data) contained in the transaction documents 112 that may be relevant to determining their respective valuation metrics. For example, a sales agreement may include terms such as quantity of product to be sold and a cost (e.g., unit cost) of the product, delivery schedules and amounts, and so on. Such information may be relevant for computing mark to market valuation. Accordingly, for each version of the sales agreement that is stored, the mark to market valuation module 212 may cause the version management module 204 to obtain and store the quantity and cost terms, delivery schedules and amounts, and so on contained in each version of the sales agreement. The information may be obtained from user-entered values or from the sales agreement. The obtained information for that version of the sales agreement may be stored in the versioned data store 124. These aspects of the present disclosure will be discussed in more detail below.

In accordance with the present disclosure, the valuation modules 212, 214 may be configured to generate a valuation metric. The valuation modules 212, 214 may access the versioned data store 124 to obtain the information used to determine or compute the valuation metric (e.g., mark to market valuation 222). In some embodiments, the valuation modules 212, 214 may also access and use information from external systems and data stores 10 to determine the valuation metric.

Figure 3:
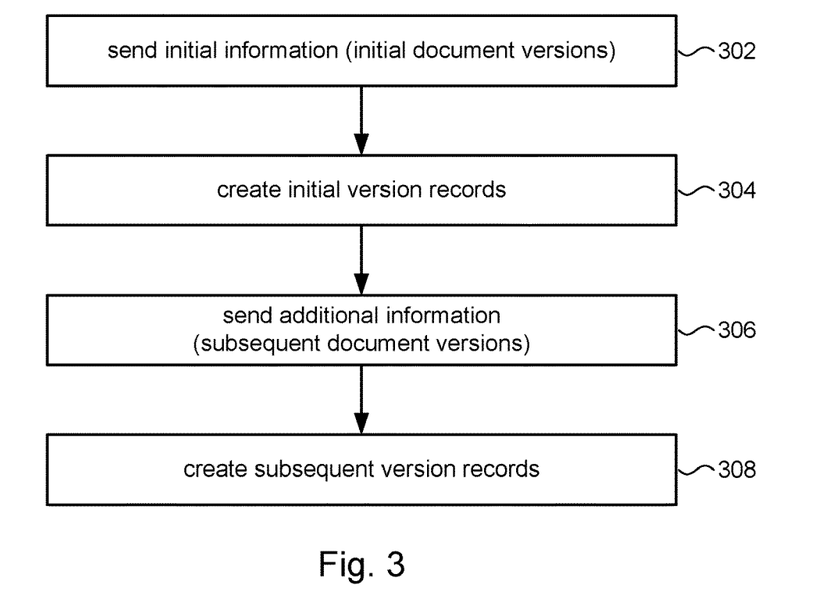
FIGS. 3 and 3A illustrate versioning in accordance with the present disclosure.

FIG. 3 shows processing among computer systems 102, 104 (FIG. 2) in accordance with the present disclosure. At block 302, users in the enterprise 100 may generate transaction documents (e.g., 112) during the course of doing business. For example, a customer may want to purchase some product. Accordingly, a sales person using a computer system 102 (e.g., at a sales office) may create a sales agreement to start the process. As another example, a user in a manufacturing facility, using another computer system 102, may order raw material or parts for manufacturing thus creating a purchase order. The computer systems 102 may send these initial versions of the transaction documents to computer system 104 to be stored in the document data store 122.

Figure 3A:
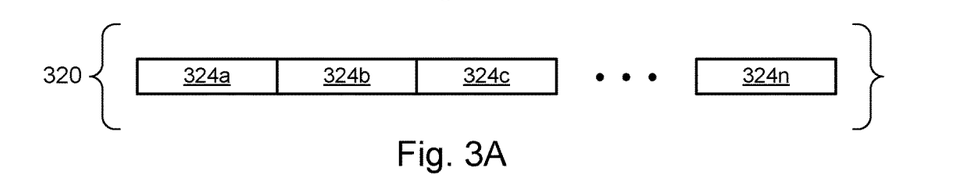

At block 304, initial version records that correspond to the initial transaction documents received at block 302 may be created and stored in the versioned data store 124. In accordance with the present disclosure, a version record 320 (FIG. 3A) may comprise data fields 324a, 324b, 324c, . . . 324n to store information contained in or associated with the corresponding transaction document. In some embodiments, for example, each version record may include a data field 324a to store information (e.g., document identifier, DOC ID) that identifies the corresponding transaction document. Each version record may include a data field 324b to store timestamp data that indicates the time of creation of the initial version of the corresponding transaction document. The timestamp may server to indicate a time from which the data in the transaction document is valid. Each version record may include additional data fields 324c-324n to store data, in the transaction document, that is relevant to one or more of the valuation metrics that can be computer or otherwise determined by the valuation modules 212, 214. Data stored in these additional data fields may be user-entered data, data obtained from the transaction document itself, and so on.

At block 306, computer systems 102 throughout the enterprise 100 may send additional information to computer system 104 representative of subsequent versions of transaction documents that have been modified or otherwise updated. For example, after an initial sales agreement is drafted, further negotiations or other factors may result in modifications to the sales agreement. As another example, inventory documents may be updated to reflect changes in the inventory stores of the enterprise 100, and so on. These transaction documents may be sent to the computer system 104 to be stored on the document data store 122.

At block 308, subsequent version records may be created in the versioned data store 124 that correspond to transaction documents received at block 306. A subsequent version record corresponding to a given transaction document that has been modified may include the document identifier of the transaction document (e.g., stored in data field 324a) and timestamp data (e.g., stored in data field 324b) that indicates the time of creation associated with this particular version of the given transaction document. Data contained in this particular version of the given transaction document may be obtained and stored in one or more of the additional data fields 324c-324n of the corresponding version record. More particularly, data that may be used by the valuation modules 212, 214 may be stored in the additional data fields 324c-324n. The additional data fields 324c-324n store data that is valid for the corresponding transaction document as of the time indicated by the timestamp data stored in data field 324b.

Processing in block 308 may be performed each time a transaction document is modified. First, a version record may be created in the versioned data store 124. The identifier of the modified transaction document is stored in the data field 324a of the created version record. Timestamp data is stored in data field 324b, which represents a time of creation of the modified transaction document; i.e., the time from which the modified transaction document is valid. Data contained in the modified transaction document used by the valuation modules 212, 214 may be stored in the additional data fields 324c-324n, thus timestamping the valuation data as of the time of creation of the modified transaction document.

Referring again to FIG. 2, in some embodiments, the enterprise 100 may perform a valuation. For example, a user (e.g., financial user) in the enterprise 100 may initiate a process to make a valuation. The user may interact with one of the valuation modules; e.g., the user may initiate a mark to market valuation using the mark to market valuation module 212. In some embodiments, the mark to market module 212 may be configured to perform a scheduled mark to market valuation at a predetermined time of day (end of day, EOD, processing) to produce a mark to market valuation 222.

Figure 4:
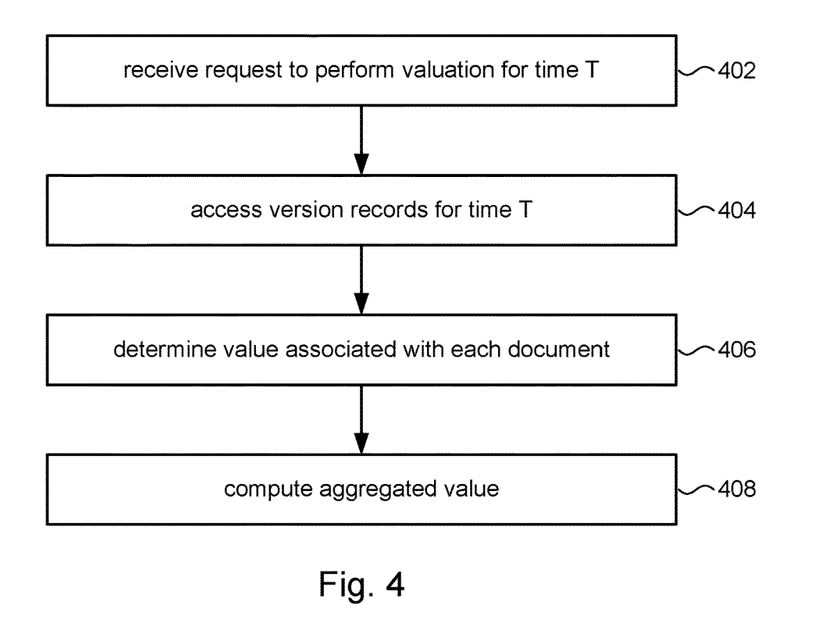
FIG. 4 illustrates valuation processing in accordance with the present disclosure.

FIG. 4 shows processing to perform a valuation in accordance with the present disclosure. At block 402, the computer system 104 may receive a request to perform a valuation. For purposes of explanation, the valuation may be assumed to be a mark to market valuation without loss of generality; however, it will be understood that any suitable valuation may be performed. The request may include a time specification T, which may include month/date, year, and time of day. In some embodiments, the time specification may be a predetermined time of day (e.g., 5 pm) at which EOD mark to market valuation is performed. In other embodiments, the time specification T may be user-defined, for example, to perform an on-demand valuation.

At block 404, version records may be accessed from the versioned data store 124 corresponding to the most recent versions of the transaction documents (e.g., 112) that are equal in time to the time specification T or earlier in time and closest to the time specification T. This process may be referred to as "snapshotting" the state of all open transactions in the enterprise 100 at a specific time. In some embodiments, the most recent version record corresponding to a given transaction document may be identified by having a timestamp that is equal in time to the time specification T, or is closest in time to, but still earlier than, the time specification T.

At block 406, a value associated with each transaction document may be computed or otherwise determined using data stored in the corresponding version record obtained in block 404. Since each version record obtained in block 404 is the most recent with respect to the time specification T, the value computed for the corresponding transaction document will be valid as of the time specification T. The specific computations performed will depend on the particular valuation (e.g., mark to market) being computed. In addition to data from the version records, the process may obtain data from external systems and data stores 10. For example, external costs such fumigation services fees, port processing fees, and so on may be accessed from external systems and data stores 10.

At block 408, an aggregated value (e.g., mark to market value) may be computed from the individual valuations associated with each transaction document computed in block 406. The specific computations for aggregating will depend on the particular valuation being computed. A simple aggregation, for example, may be to sum together the individual valuations.

Figure 5A:
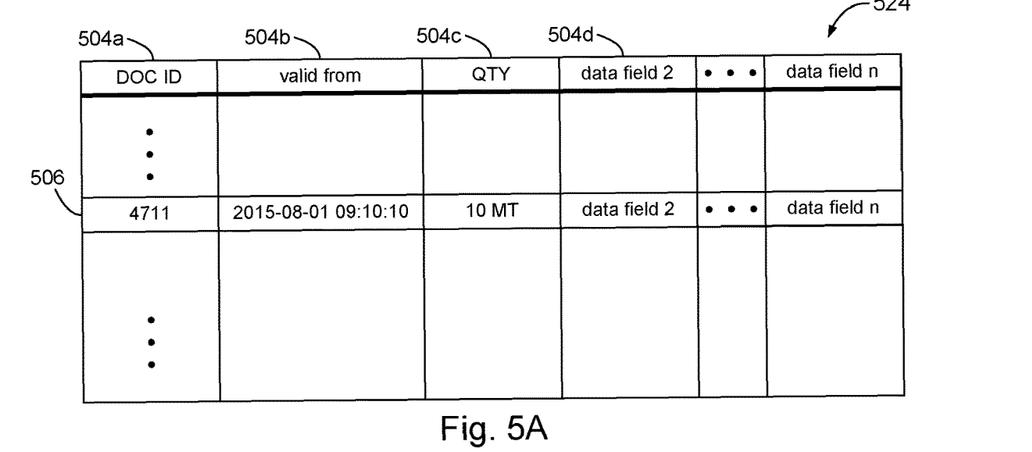
FIGS. 5A, 5B, and 5C illustrate an example of a versioned data store in accordance with the present disclosure.

FIG. 5A shows an example of a versioned data store 524 in accordance with some embodiments of the present disclosure. The versioned data store 524 may comprise data fields 504a, 504b, 504c, 504d, and so on. One data field 504a may be used to store a document identifier of a corresponding given transaction document (e.g., 112). Another data field 504b may store timestamp data representative of the time that the corresponding transaction document was created or updated. In some embodiments, the timestamp information may include calendar time (e.g., expressed as month, day, year) and time of day (e.g., expressed in 24 hour format).

The remaining data fields 504c, 504d, and so on may store data contained in the corresponding transaction document. In accordance with the present disclosure, information relevant to computing or otherwise determining a value of the transaction document may be stored in the remaining data fields data fields 504c, 504d, and so on. The information may include terms contained in the transaction documents such as amounts, unit price, etc. Other examples may include a future rate that fixes a future component in a transaction document for a commodity, deductions/surcharges to reflect quality deviations against the standard commodity traded at the commodity exchanges, and so on.

The information may include a calculation schema and/or formula logic to calculate prices; for example, conditions, condition rates, discounts, surcharges, and so on. The information may include organization-defined rules to value transactions (e.g., which future and basis would 'per market norm/orthodoxy definition' be applied to price/value a transaction happening for a specific commodity (e.g., wheat, soybean, etc.) at a specific location (e.g. Kansas, Minneapolis, etc.).

FIG. 5A shows a version record 506 that corresponds to a transaction document identified by document identifier 4711. The timestamp data indicates that the data stored in version record 506 is valid from Aug. 1, 2015 at 9:10 am. The data field 504c represents a quantity term in transaction documents, and for transaction document 4711, the quantity term is 10 MT as of Aug. 1, 2015 at 9:10 am. It will be understood that the remaining data fields 504d and so on in version record 506 may be filled with other data relevant to computing or otherwise determining a value of the corresponding transaction document. The data may be obtained from the transaction document itself, from a database, from a user, and so on.

Figure 5B:
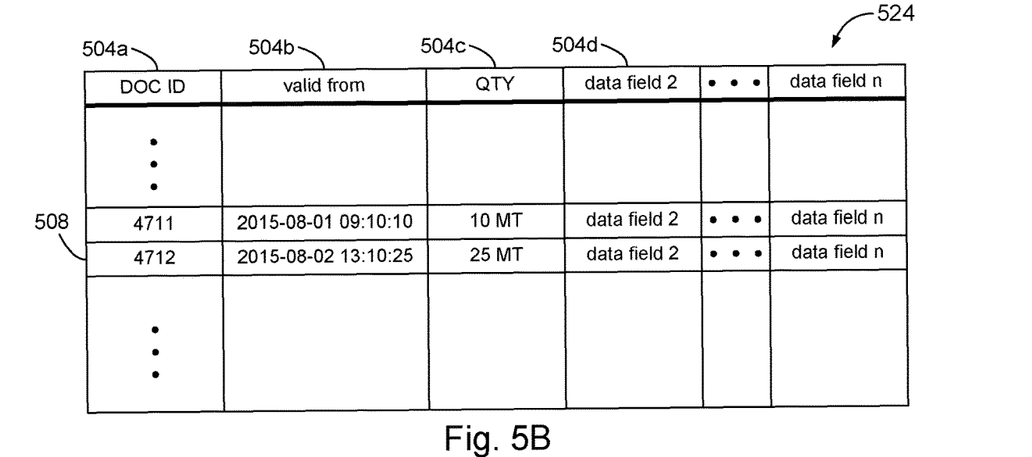

FIG. 5B shows another version record 508 added to the versioned data store 524. The version record 508 may represent the transaction document for a new deal. The transaction document, identified as 4712, may have been created Aug. 2, 2015 at 1:10:25 pm and involves a quantity of 25 MT.

Figure 5C:
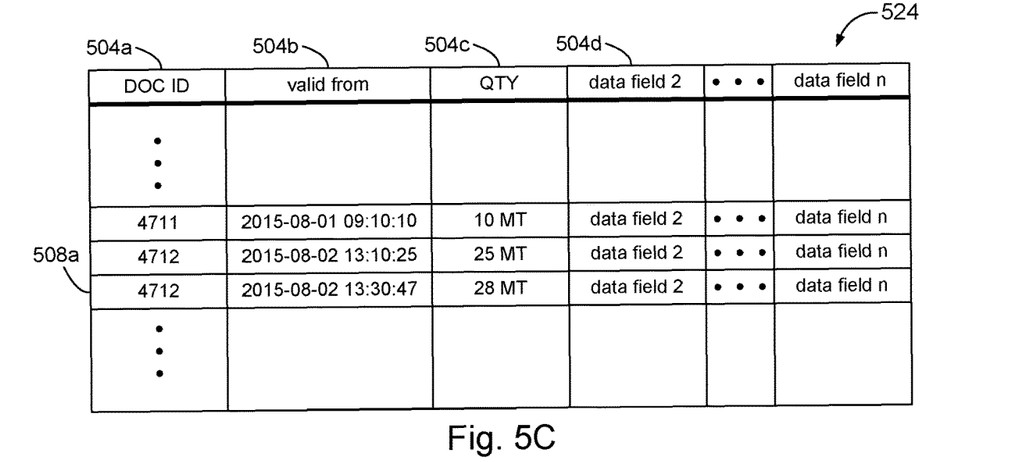

FIG. 5C shows another version record 508a added to the versioned data store 524. The version record 508a may represent a modification made to transaction document 4712. The modification may have been made Aug. 2, 2015 at 1:30:47 pm to change the quantity term from 25 MT to 28 MT. In particular, the version record 508a contains the new data in the modified version of transaction document 4712 as of Aug. 2, 2015 at 1:30:47 pm.

It can be seen from FIGS. 5A-5C that a snapshot (for valuation purposes) of the transaction documents in the enterprise 100 at any given time T can determined. For each transaction document (e.g., 4711, 4712, etc.) simply identify the corresponding version record that is closest in time to and earlier than the given time T, or is equal in time to the given time T.

Figure 6:
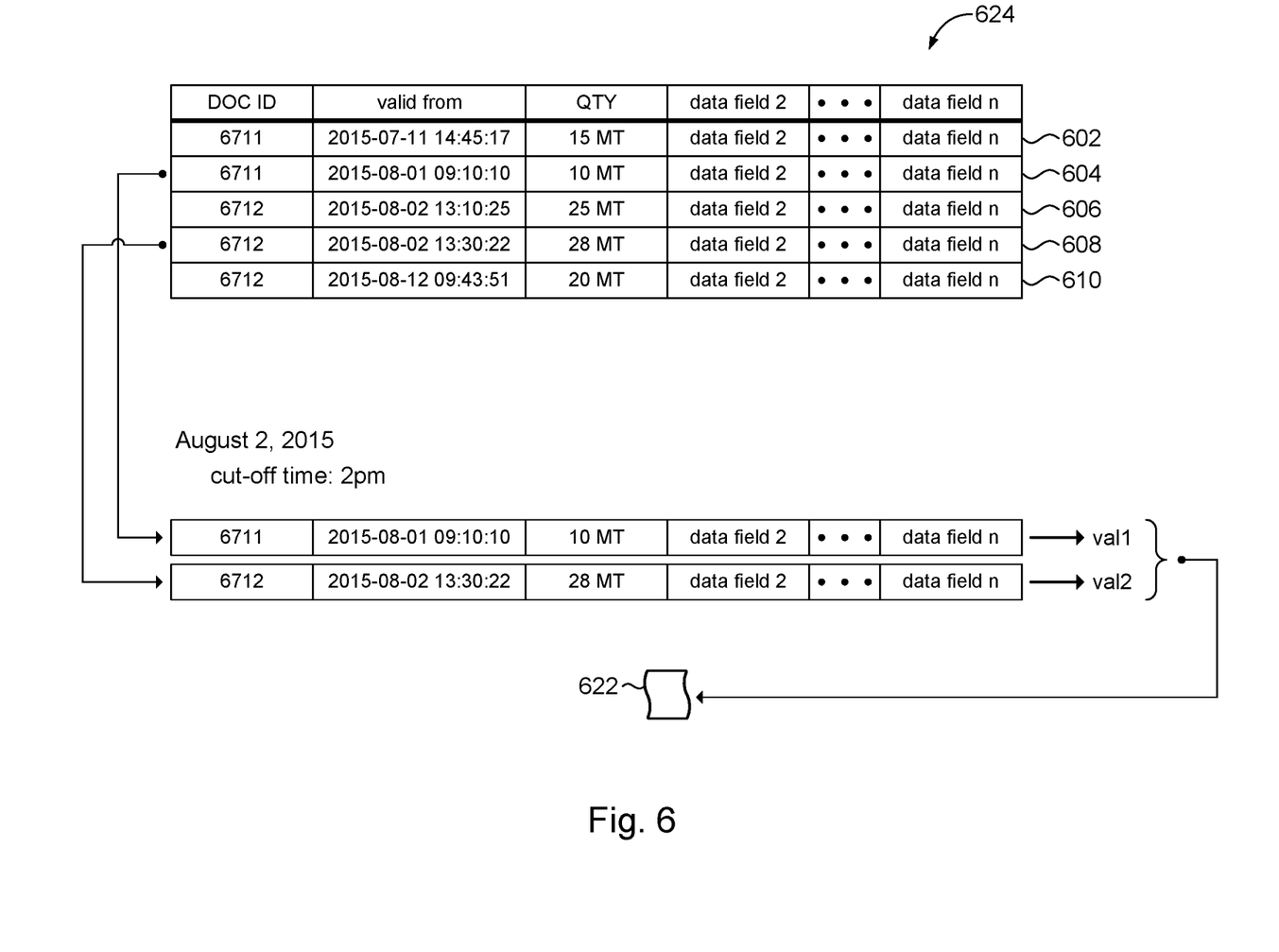
FIG. 6 illustrates an example of valuation processing in accordance with the present disclosure.

FIG. 6 illustrates valuation processing using the versioned data store 624 as an example. For purposes of the example, assume the versioned data store 624 contains version records 602, 604, 606, 608, and 610 for two transaction documents, 6711 and 6712. Transaction document 6711 was created July 11 and subsequently modified on August 1. Transaction document 6712 was created August 2, 1:10 pm and subsequently modified later that day at 1:30 pm and again on August 12, 9:43 am.

Suppose a mark to market valuation is initiated on Aug. 2, 2015 specifying a cut-off time of 2 pm; e.g., the time specification is Aug. 2, 2105 2 pm. Transaction document 6711 is associated with two version records 602, 604, both of which are earlier in time than the Aug. 2, 2105 2 pm cut-off time. Version record 604 corresponds to a version of transaction document 6711 that is closest in time to but still earlier than the cut-off time Aug. 2, 2015 2 pm. Accordingly, version record 604 would be accessed for computing or otherwise determining a value val1 of transaction document 6711. In addition to using data stored in the version record 604, computing or otherwise determining the value val1 of transaction document 6711 may include accessing data from various external systems and data stores 10 (FIG. 1).

Transaction document 6712 is associated with version records 606, 608, 610. Version records 606, 608 are both earlier in time than the Aug. 2, 2105 2 pm cut-off time; version record 610 is later in time relative to the cut-off time. Version record 608 corresponds to a version of transaction document 6712 that is closest in time to and earlier than the cut-off time Aug. 2, 2015 2 pm. Accordingly, version record 608 would be accessed for computing or otherwise determining a value val2 of transaction document 6712. In addition to using data stored in the version record 608, computing or otherwise determining the value val2 of transaction document 6712 may include accessing data from various external systems and data stores 10.

An aggregated valuation 622 may be computed or otherwise determined by combining the valuations of each transaction document, in this example val1 and val2. In addition, data from various external systems and data stores 10 may be used to produce the aggregated valuation 622.

Figure 7:
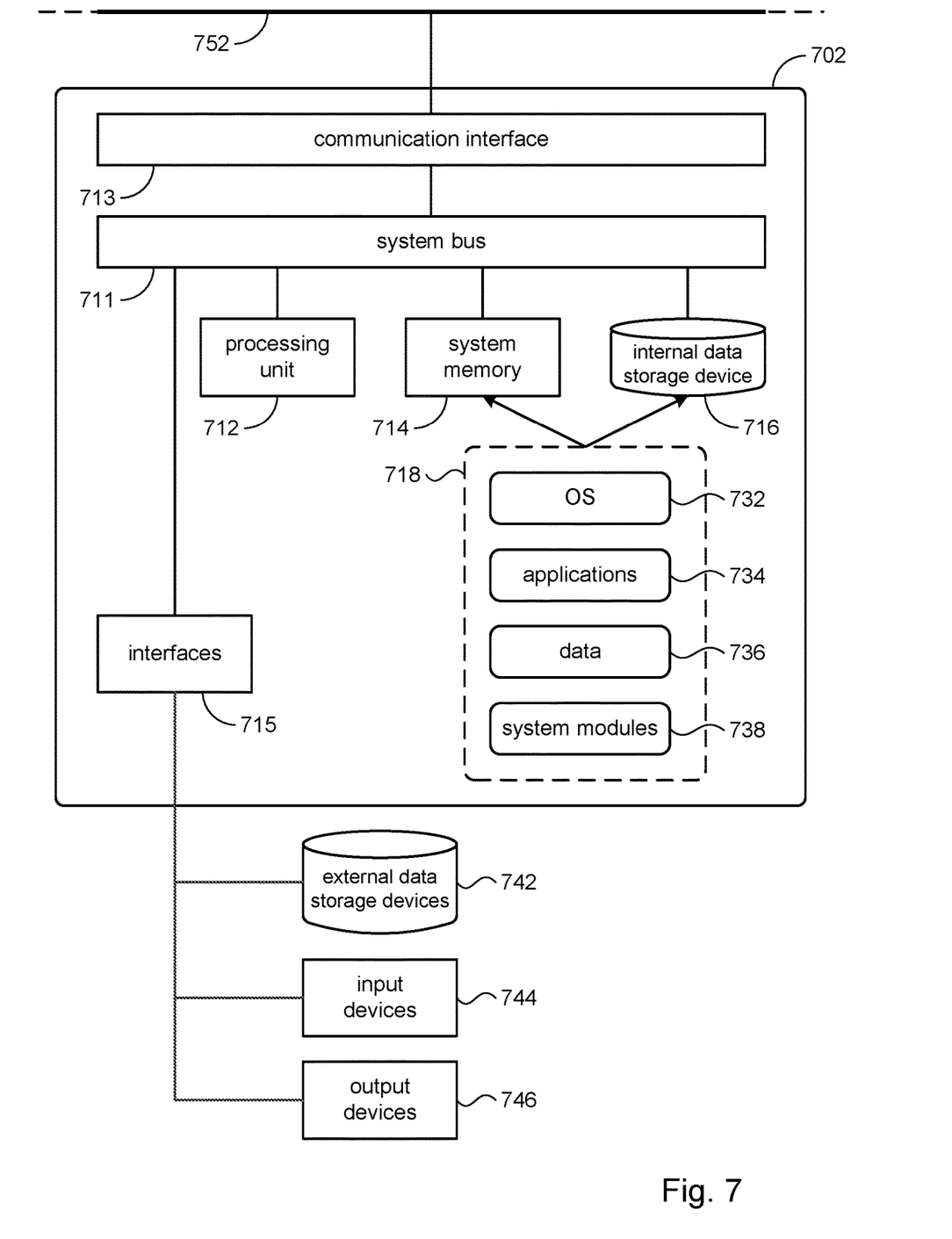
FIG. 7 shows an illustrative example of a computer system configured in accordance with the present disclosure.

Referring to FIG. 7, in some embodiments, each of the computer systems 102, 104 may include a computing unit 702 having a processing unit 712, a system memory 714, and a system bus 711. The system bus 711 may connect various system components including, but not limited to, the processing unit 712, the system memory 714, an internal data storage device 716, and a communication interface 713.

The processing unit 712 may comprise a single-processor configuration, or may be a multi-processor architecture. The system memory 714 may include read-only memory (ROM) and random access memory (RAM). The internal data storage device 716 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on).

The internal data storage device 716 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 714 and/or the internal data storage device 716 may store a number of program modules, including an operating system 732, one or more application programs 734, program data 736, and other program/system modules 738. For example, in a computing unit 702 configured as computer system 104, the application programs 734, which when executed, may cause the computing unit 702 to perform the processing shown in FIGS. 3 and 4.

The external data storage devices 742 may represent various data stores. For example, in a computing unit 702 configured as computer system 104, the external data storage devices 742 may be the document data store 122 and/or the versioned data store 124.

Access to the computing unit 702 may be provided by a suitable input device 744 (e.g., keyboard, mouse, touch pad, etc.) and a suitable output device 746, (e.g., display screen). In a configuration where the computing unit 702 is a mobile device, input and output may be provided by a touch sensitive display.

The computing unit 702 may operate in a networked environment using logical connections via wired and/or wireless communications to one or more remote computers (not shown) over a communication network 752. The communication network 752 may be a local area network (LAN) and/or larger networks, such as a wide area network (WAN).

Advantages and Technical Effect

Valuation of the transaction documents 112 (FIG. 1) in an enterprise 100 in accordance with the present disclosure may be conducted using data stored in the version records that correspond to the transaction documents, rather than having to access the actual transaction documents. Accordingly, users can continue to conduct business without disruption from the valuation process. More particularly, transaction documents can be modified and otherwise updated by users even though a valuation process is in progress. Conversely, users in the enterprise 100 who need to modify transaction documents at the same time that a valuation process is in progress can do so without corrupting an ongoing valuation process.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method for computing a valuation of an enterprise, the method comprising:
   a second computer receiving transaction documents containing information from a plurality of first computers and in response thereto, the second computer:
   creating initial records in a database corresponding to the transaction documents, the initial records including a first initial record; and
   storing into the initial records document identifiers identifying corresponding transaction documents, valuation data, and timestamp data representative of months, dates, and hours associated with the corresponding transaction documents, the first initial record storing a first document identifier identifying a first transaction document, first valuation data, and first timestamp data;
   the second computer receiving updates to the information contained in one or more of the transaction documents from the plurality of first computers and in response thereto, the second computer:
   creating additional records in the database corresponding to the updates to the one or more transaction documents, each of the additional records being representative of an update made to a particular transaction document, the additional records including a first additional record; and
   storing into the additional records document identifiers identifying corresponding transaction documents of the one or more transaction documents and timestamp data representative of months, dates, and hours associated with the updates to the one or more transaction documents, the first additional record storing the first document identifier, second valuation data different from the first valuation data, and second timestamp data; and
   the second computer receiving a request to compute the valuation of the enterprise, the request including a specified time indicating a specified hour, a first time of the first timestamp data being equal in time to or earlier in time than the specified time, a second time of the second timestamp data being later in time than the specified time, the second computer processing the request to compute the valuation of the enterprise by:
   accessing a plurality of records stored in the database having timestamps equal in time to or earlier in time than the specified time and having timestamps closer to the specified time compared to other records having the same document identifier, the accessing of the plurality of records including accessing the first initial record;
   computing a transaction value for each of the accessed plurality of records based on the corresponding valuation data while at the same time receiving and processing further updates to the information contained in transaction documents corresponding to the accessed plurality of records, access to the transaction documents not being locked during the processing of the request to compute the valuation, the first transaction document corresponding to the first initial record being updated and the first additional record being created during the processing of the request to compute the valuation, wherein records corresponding to the further updates have timestamps later than the specified time and are not used in the computing of the valuation of the enterprise, the first additional record not used in the computing of the valuation; and
   computing an aggregated value using the computed transaction value, based on the corresponding valuation data, for each of the accessed plurality of records, the aggregated value representing the valuation of the enterprise at the specified time.

2. A system, comprising:
   a second computer configured to receive transaction documents containing information from a plurality of first computers;
   in response to the transaction documents being received, the second computer configured to:
   create initial records in a database corresponding to the transaction documents, the initial records including a first initial record; and
   store into the initial records document identifiers identifying corresponding transaction documents, valuation data, and timestamp data representative of months, dates, and hours associated with the corresponding transactions, the first initial record storing a first document identifier identifying a first transaction document, first valuation data, and first timestamp data;
   the second computer configured to receive updates to the information contained in one or more of the transaction documents from the plurality of first computers;
   in response to the updates being received, the second computer configured to:
   create additional records in the database corresponding to the updates to the one or more transaction documents, each of the additional records being representative of an update made to a particular transaction document, the additional records including a first additional record;
   store into the additional records document identifiers identifying corresponding transaction documents of the one or more transaction documents and timestamp data representative of months, dates, and hours associated with the updates to the one or more transaction documents, the first additional record storing the first document identifier, second valuation data different from the first valuation data, and second timestamp data; and
   the second computer configured to receive a request to compute a valuation of an enterprise, the request including a specified time indicating a specific hour, a first time of the first timestamp data being equal in time to or earlier in time than the specified time, a second time of the second timestamp data being later in time than the specified time, the second computer configured to compute the valuation of the enterprise by:
   accessing a plurality of records stored in the having timestamps equal in time to or earlier in time than the specified time and having timestamps closer to the specified time compared to other records having the same document identifier, the accessing of the plurality of records including accessing the first initial record;
   computing a transaction value for each of the accessed plurality of records based on the corresponding valuation data while at the same time receiving and processing further updates to the information contained in the transaction documents corresponding to the accessed plurality of records, access to the transaction documents not being locked during the processing of the request to compute the valuation, the first transaction document corresponding to the first initial record being updated and the first additional record being created during the processing of the request to compute the valuation, wherein records corresponding to the further updates have timestamps later than the specified time and are not used in the computing of the valuation of the enterprise, the first additional record not used in the computing of the valuation; and computing an aggregated value using the computed transaction value,. based on the corresponding valuation data, for each of the accessed plurality of records, the aggregated value representing the valuation of the enterprise at the specified time.

3. A non-transitory computer readable storage medium having stored thereon computer executable program instructions, which when executed by a computer system cause the computer system to perform steps comprising:

the computer system receiving transaction documents from a plurality of first computers;

in response to the receiving of the transaction documents, the computer system:

creating initial records in a database corresponding to the transaction documents, the initial records including a first initial record; and storing into the initial records document identifiers identifying the corresponding transaction documents, valuation data, and timestamp data representative of months, dates, and hours associated with the corresponding transaction documents, the first initial record storing a first document identifier identifying a first transaction document, first valuation data, and first timestamp data;

the computer system receiving updates to the information contained in one or more of the transaction documents from the plurality of first computers;

in response to the receiving of the updates, the computer system:

creating additional records in the database corresponding to the updates to the one or more transaction documents, each of the additional records being representative of an update made to a particular transaction document, the additional records including a first additional record; and storing into the additional records document identifiers identifying corresponding transactions documents of the one or more transaction documents and timestamp data representative of months, dates, and hours associated with the updates to the one or more transaction documents, the first additional record storing the first document identifier, second valuation data different from the first valuation data, and second timestamp data; and the computer system receiving a request to compute a valuation of an enterprise, the request including a specified time indicating a specified hour, a first time of the first timestamp data being equal in time to or earlier in time than the specified time, a second time of the second timestamp data being later in time than the specified time, the second computer processing the request to compute the valuation of the enterprise by:

accessing a plurality of records stored in the database having timestamps equal in time to or earlier in time than the specified time and having timestamps closer to the specified time compared to other records having the same document identifier, the accessing of the plurality of records including accessing the first initial record;

computing a transaction value for each of the accessed plurality of records based on the corresponding valuation data while at the same time receiving and processing further updates to the information contained in the transaction documents corresponding to the accessed plurality of records, access to the transaction documents not being locked during the processing of the request to compute the valuation, the first transaction document corresponding to the first initial record being updated and the first additional record being created during the processing of the request to compute the valuation, wherein records corresponding to the further updates have timestamps later than the specified time and are not used in the computing of the valuation of the enterprise, the first additional record not used in the computing of the valuation; and computing an aggregated value using the computed transaction value, based on the corresponding valuation data, for each of the accessed plurality of records, the aggregated value representing the valuation of the enterprise at the specified time.

4. The method of claim 1, wherein the valuation of the enterprise is a mark to market value of the enterprise.

5. The method of claim 1, wherein the transaction documents comprise purchase contracts and sales contracts in the enterprise.

6. The method of claim 1, wherein the transaction documents comprise inventory documents indicative of inventory in the enterprise.

7. The method of claim 1, further comprising the second computer receiving additional value information from external systems separate from the enterprise, and the second computer using the additional value information in the computing of the transaction value for each of the accessed plurality of records.

8. The method of claim 1, further comprising the second computer storing the transaction documents and the updates to the information contained in one or more of the transaction documents in a document database.

9. The method of claim 1, wherein the specified time is a predetermined timestamp, and wherein the second computer receives another request including the predetermined timestamp once every business day over a time period.

10. The method of claim 1, wherein the specified time is defined by a user on demand.

11. The method of claim 1, wherein the initial records include a first initial record having a first document identifier and a first time stamp earlier than the specified time, wherein the additional records include a second additional recording having the first document identifier and a second time stamp later than the specified time, wherein the accessing of the plurality of records stored in the database including accessing the first initial record and does not include accessing the second additional record, wherein the computing of the transaction value for each of the accessed plurality of records includes computing a first transaction value for the first initial records, wherein the computing of the aggregated value representing the valuation of the enterprise at the specified time is not based on the second additional record.

12. The system of claim 2, wherein the valuation of the enterprise is a mark to market value of the enterprise.

13. The system of claim 2, wherein the transaction documents comprise purchase contracts and sales contracts in the enterprise.

14. The system of claim 2, wherein the transaction documents comprise inventory documents indicative of inventory in the enterprise.

15. The system of claim 2, wherein the second computer is further configured to receive additional value information from external systems separate from the enterprise, and the second computer using the additional value information received in the computing of the transaction value for each of the accessed plurality of records.

16. The system of claim 2, wherein the specified time is a predetermined timestamp, and wherein the second computer receives another request including the predetermined time stamp once every business day over a time period.

17. The non-transitory computer readable storage medium of claim 3, wherein the valuation of the enterprise is a mark to market value of the enterprise.

18. The non-transitory computer readable storage medium of claim 3, wherein the transaction documents comprise purchase contracts, sales contracts, and inventory documents indicative of inventory in the enterprise.

19. The non-transitory computer readable storage medium of claim 3, wherein the computer executable program instructions, which when executed by a computer system further cause the computer system to receive additional value information from external systems separate from the enterprise and use the additional information in the computing of the transaction value for each of the accessed plurality of records.

20. The non-transitory computer readable storage medium of claim 3, wherein the specified time is a predetermined timestamp, and wherein the computer executable program instructions, which when executed by a computer system further cause the computer system to receive another request including the predetermined timestamp once every business day over a time period.

\* \* \* \* \*